Aug. 1, 1967  P. J. NILSEN ETAL  3,333,744
VALVE AND NOZZLE CONSTRUCTION FOR AEROSOL
WHIPPED CREAM DISPENSER
Filed Oct. 22, 1965  2 Sheets-Sheet 2
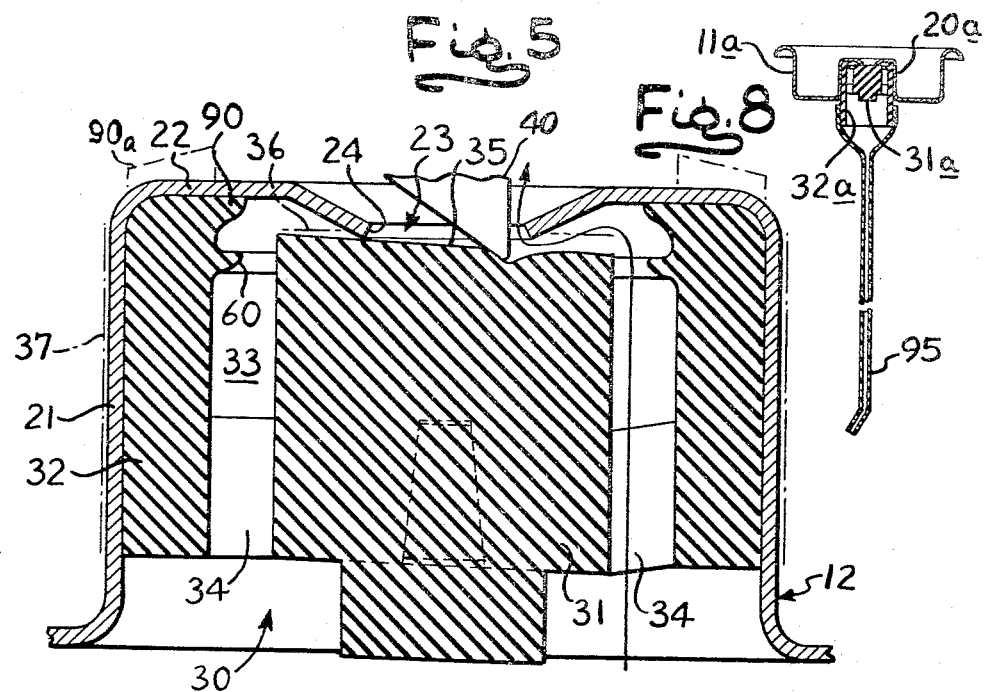
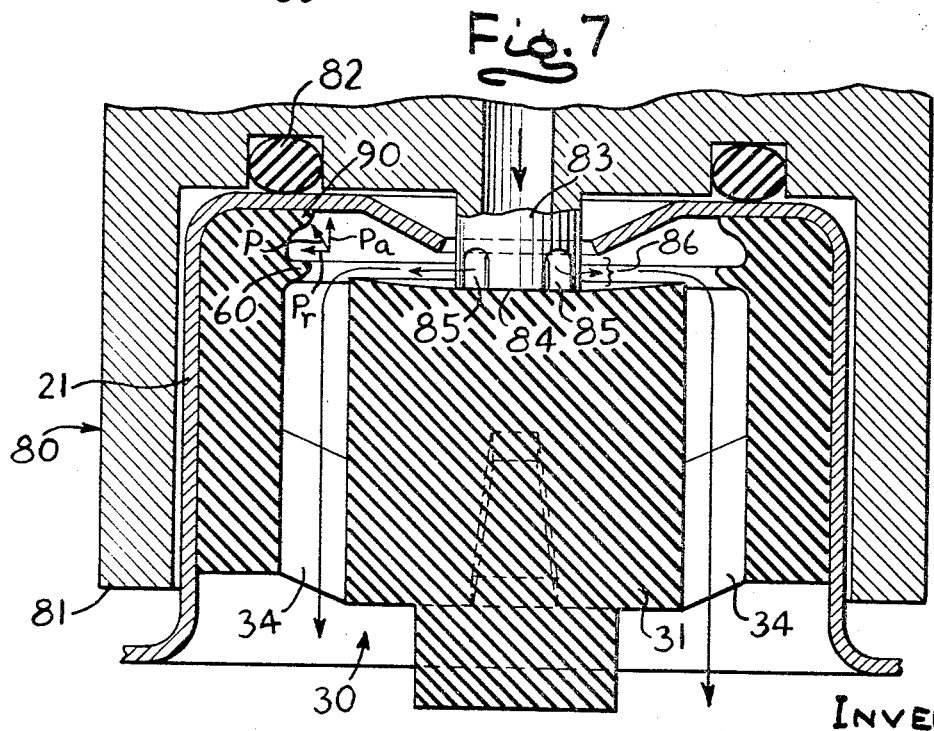
INVENTORS
PETER J. NILSEN
MERLE D. ZAMZOW
by: Wolfe, Hubbard, Voit & Osann
ATTYS.

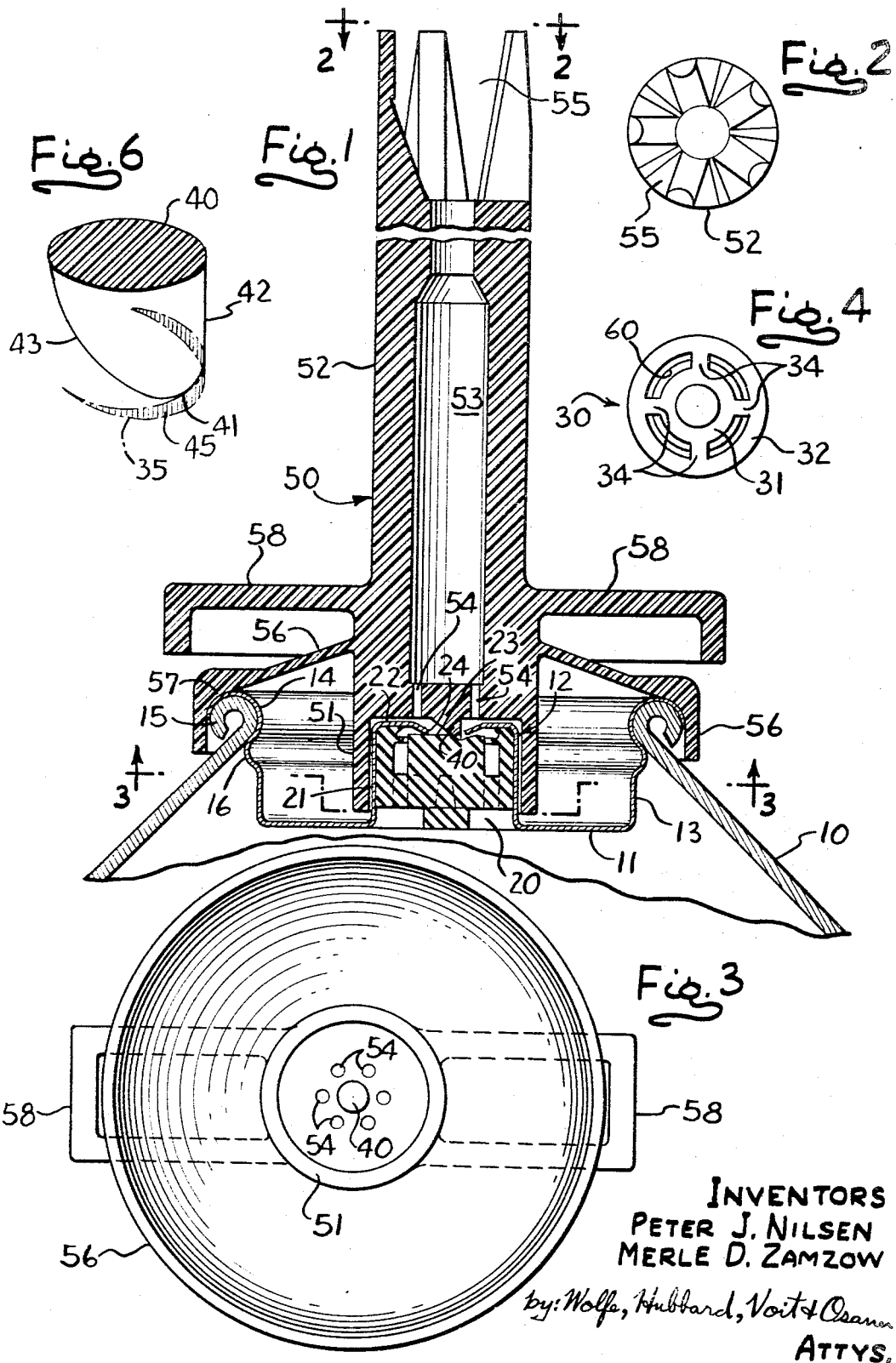

United States Patent Office 3,333,744
Patented Aug. 1, 1967

3,333,744
VALVE AND NOZZLE CONSTRUCTION FOR AEROSOL WHIPPED CREAM DISPENSER

Peter J. Nilsen and Merle D. Zamzow, both of P.O. Box 127, Haines City, Fla. 33844
Filed Oct. 22, 1965, Ser. No. 500,579
12 Claims. (Cl. 222—402.13)

The present invention relates to dispensers for dispensing whipped cream, for example, in single servings, under fingertip control.

The large number of patents relating to valves for whipped cream dispensers bears testimony to the fact that there is a continuing search for a valve which meets all conceivable, sometimes conflicting, requirements, both operational and economic. Accordingly, it is an object of the present invention to provide a valve arrangement for a whipped cream dispenser which is absolutely reliable, which dispenses whipped cream of high quality in precisely controlled amounts with light fingertip pressure free of the sudden or explosive gushing which characterizes most commercial dispensers. In this connection, it is an objeect to provide a whipped cream dispensing arrangement which, in spite of the fine degree of control provided, nevertheless achieves this control by the variation of the pressure which is applied to the nozzle, thereby making the release a matter of "feel" since the actual movement of the nozzle is hardly detectable. In this connection also it is an object to provide a nozzle and valve arrangement in which the flow is not only finely controlled but positively limited, by bottoming action of the nozzle, to a moderate rate so that little thought or care need be exercised in its use and making it ideal for use by small children.

It is still another object of the invention to provide a valve in which the various parts thereof are integrally formed of a single, small piece of molded rubber which which may be produced at negligible cost and which may be installed by pressing into place inside the hub of a cap of standard configuration, with proper installation being assured simply by bottoming the insert in the hub.

It is an important object of the invention to provide a simple and inexpensive valve arrangement which is nevertheless reliable and easily controlled even in the face of pressures which greatly exceed the pressures conventionally used for whipped cream or the like. Thus it is an object to provide a valve arrangement which achieves, by reason of the higher pressure a quality of whipped cream which has defied achievement in a throw-away can using prior valves of more conventional construction.

It is, moreover, an object of the invention to provide a valve insert for a whipped cream dispenser which not only permits precise control upon discharge but which remains securely in place, in face of applied pressure, during the inrush of a charging operation.

It is an object of the invention in one of its aspects to provide a novel valve insert which, while particularly well suited for use with the disclosed nozzle or plunger configuration, is of general utility and may be used with nozzles of different specific design.

Other objects and advantages of the invention will become apparent upon reading the attached detailed description and upon reference to the drawings in which:

FIGURE 1 is a longitudinal section showing a valve and nozzle assembly constructed in accordance with the teachings of the present invention;

FIG. 2 is an end view of the nozzle tip looking along the line 2—2 in FIG. 1;

FIG. 3 is a view of the underside of the nozzle looking along the line 3—3 in FIG. 1 with the nozzle removed from the dispenser;

FIG. 4 is a lower end view of the valve insert of FIG. 1;

FIG. 5 is an enlarged axial section taken through the valve assembly of FIG. 1 showing the valve cracked open for discharge;

FIG. 6 is a diagram corresponding to FIG. 5 showing the crescent shape of the dicharge opening;

FIG. 7 is an enlarged axial section showing unseating of the valve by a suitable filling nozzle as the dispenser is initially charged.

FIG. 8 shows use of the invention with a dip tube.

While the invention has been described in connection with a preferred embodiment, it will be understood that we do not intend to be limited to the particular embodiment illustrated but intend, on the contrary, to cover the various alternative and equivalent constructions included within the spirit and scope of the appended claims.

Referring now to the drawings, there is disclosed, in FIGURE 1, a whipped cream container 10 having a cap 11, the cap being formed with a central hub 12 and an outer wall 13 terminating in a curl 14 which conforms to the neck 15 of the container. For the purpose of securing the cap in place in the face of high pressure in the container, the outer wall of the cap is formed with an annular bead 16 which is positioned directly under the neck of the container. It will suffice to say that the bead places a resilient gasket (not shown), interposed between the members 14, 15, under sufficient pressure so that gastight integrity is assured. The hub 12 is of cylindrical shape, having a space 20 defined by a cylindrical side wall 21 and an end wall 22, with the latter having an opening 23 at its center with an edge, or seat, 24 (see also FIG. 5).

In carrying out the present invention a rubber valve insert is mounted in the hub 12 having a central or valve portion, and an encircling collar portion for holding the valve portion in place, the two portions being integral with one another and having a resilient interconnection permitting the valve portion to move inwardly in response to a dislodging force applied at one side of the discharge opening to form a controllable orifice. Thus, as shown in FIG. 5, we provide a rubber insert 30 having a central cylindrical portion 31 and an outer or collar portion 32 which define an annular space 33 between them. The portions 31, 32 are preferably interconnected by spokes 34 which may, for example, be four in number (see FIG. 4) and which extend radially in the angular space 33. The two portions of the insert are preferably dimensioned so that when the collar portion 32 is fully seated, the presented end of the valve portion, indicated at 35, will be seated against the edge 24 of the opening even in the absence of pressure in the container. Thus, when the insert is in its unstressed state, prior to insertion into the hub, the central portion occupies the relative position shown at 36. Similarly, in the unstressed state, the collar portion 32, being larger in diameter than when inserted, has an outline as indicated at 37. As shown in the drawing, the collar 32 is of elongated cylindrical shape having an outer surface which is substantially coextensive with the valve member 31 and which provides resilient engagement with the inner surface of the cylindrical wall 21 of the hub over an extensive area.

In accordance with one aspect of the present invention, a plunger is provided having a relatively sharp tip which extends through the discharge opening at one side thereof and which presents a sufficiently localized force so that the adjacent valve surfaces are cracked open to define a crescent-like escape orifice. More specifically in accordance with the invention, the plunger tip is of angled "spade" shape applying its force at the edge of the opening to create an escape orifice of crescent shape in which the length and width of the orifice are progressively varied and with means for severely limiting the stroke. Thus, referring to FIG. 6, the plunger, indicated at 40, has a leading edge 41, a front face 42, and an angled back surface 43. Upon pressing the plunger inwardly, the edge 41 thereof unseats the valve member 31 about the adjacent portion of its periphery, thereby forming an escape orifice 45 of crescent shape, defined by the valve seat 24, and the presented surface 35 of the valve member. Relatively slight pressure is required to initiate the crescent, and as the force on the plunger is increased, the orifice progressively enlarges to the condition shown.

In accordance with one of the features of the invention, the valve plunger 40 is embodied in a nozzle having a central recess for the hub and having a stop surface for limiting the endwise movement of the plunger as well as a chamber for accommodating the cream as it expands into whipped form. Thus, referring to FIGURE 1, we have provided a nozzle 50 having a lower portion 51 which telescopes over the hub 12 and a hollow neck portion 52 having a central expansion chamber 53. The discharge orifice 45 communicates with the expansion chamber 53 via a set of axially extending passages 54. Upon expansion into whipped form, the cream is discharged from a castellated tip 55.

It will be understood that while a small amount of clearance has been shown in the drawing to indicate that the parts are relatively movable, there is preferably a rather snug telescoping connection between the outer wall 21 of the hub and the inner wall of the lower portion 51 of the nozzle. The stop function is preferably performed by a land surface inside the nozzle and which surrounds the plunger 40, such surface seating in its bottomed condition on the presented end of the hub. Alternatively, the lower edge 51 of the nozzle may be dimensioned to bottom on the floor of the cap to limit total nozzle movement.

For the purpose of shielding and enclosing the cap 11, the nozzle is provided with an integral skirt 56 having a telescoping fit with respect to the curl 14 of the cap and which is preferably resilient so as to accommodate the small inward movement of the nozzle. Adequate resilience is achieved where the nozzle is molded in a single piece of some semi-rigid plastic material such as polyethylene or polypropylene. The resilience of the skirt 56 provides a useful restoring force to insure that the nozzle returns to its original position, with prompt closure of the valve orifice, when the force on the nozzle is released. The skirt 56 may itself serve as a fingerhold for squeezing inwardly upon the nozzle, but in the preferred construction integral wings 58 are integrally formed on the side of the nozzle conveniently engaged by the first two fingers when the container is held, inverted, in the palm of the user. The wings are of inverted channel cross section so that they are relatively rigid in the face of applied finger force.

The fact that the nozzle is guided for axial movement, and that such movement is severely limited, will normally reduce any tendency for the valve member 31 to shift sideways with respect to the opening 23 which it serves to close; nevertheless, it is one of the features of the valve insert that means are provided for insuring against any excessive lateral movement. This is accomplished in the present instance by providing a lateral stop surface in the annular space 33. Thus, referring to FIG. 5, a ridge 60 is integrally molded on the inner wall of the collar 32 facing the central valve portion 31 to guarantee that the valve portion will be maintained, at all times, in a generally centered position, even where using a valve plunger of offset design which differs from that which has been described.

In order to increase the reliability of the seal at the edge 24 of the discharge opening, the metal surrounding the opening is preferably dished inwardly as shown, thus establishing "line" as contrasted with "area" contact and resulting in more precise response to an unseating force applied along the edge.

Although it is one of the primary features of the valve insert 30 that a positive seal is provided during periods of storage, with precise control of the discharge during periods of use, it is one of the further features of the construction that the central or valve portion of the insert may be displaced inwardly a substantial amount to provide a relatively large "fill" opening without dislodging the insert from its seated position within the hub.

Stated in other words, while the construction is ideally suited for use with a relatively sharp off-center plunger to provide a crescent-shaped orifice for discharge, it is capable also of being displaced axially, free of any cocking movement, during the charging step. Thus, as shown in FIG. 7, a filling nozzle may be used as indicated at 80 having a skirt 81 which telescopes over the hub and an annular gasket 82 which seats on the presented end of the hub. Extending axially at the center is a nozzle tip 83 having an end face 84 and discharge openings 85. With the tip of the nozzle pressed in place an annular opening 86, having a large total area, results. To prevent the insert from being blown out of its seated position because of the pressure of the entering gas, the collar 32 is provided at its upper edge with an inwardly extending and tapering flange 90 which seats against the end surface 22 of the hub. The pressure P which exists in the annular space 33 of the insert has an axial component $P_a$ which acts to hold the insert in its seated or bottomed position. The radial component, indicated at $P_r$, also assists in keeping the insert in place since it increases the frictional force which is applied outwardly by the collar 32 and thus increases the frictional force between the collar and the cylindrical wall of the hub.

While the operation of the valve and nozzle assembly will be apparent from the foregoing description, it may be helpful to summarize it briefly. Liquid cream is introduced through the neck of the container 10 to a predetermined level. Following this the cap 11, with the valve insert 30 seated in the hub, is placed upon the container and the bead 16 is formed by a suitable tool thus locking the cap in place. The container is then engaged by a filling nozzle as shown in FIG. 7, with the nozzle tip serving to unseat the valve portion 31 for admission of the pressurizing gas which may be a combination of nitrous oxide and carbon dioxide. The gas is added from a source which may, for example, be at a pressure of 235–250 lbs. per square inch, the container being shaken as the gas is admitted in order to insure that the gas is promptly dissolved. The "fill" nozzle is withdrawn and when the gas reaches an equilibrium condition, the pressure within the container, under normal conditions of ambient temperature, will be found to be approximately 200 lbs. per square inch. It is found that the use of such higher pressure increases the quality of the whipped product and that the present valve arrangement, in spite of its simplicity, is more than capable of withstanding such pressure. This pressure is to be compared with the substantially lower pressures usually employed with conventional valves in throw-away cans on the order of 140 lbs. initially and falling within the range of, say, 110–125 lbs. per square inch upon reaching equilibrium.

The filled containers may then move into the channels of trade, equipped with a dispensing nozzle 50 which may be separate or attached. The internal pressure has a substantial reinforcing effect upon the rubber insert and provides sufficient bias to insure that the nozzle is normally urged to its outermost position as indicated by the dot dashed lines 56a, 58a in FIGURE 1.

To use the container it is inverted and pressure is applied endwise to the wings 58 which form the finger hold. This causes the spade-shaped tip of the plunger 40 to be pressed into the valve member 31, unseating the latter along one side to define a crescent-shaped discharge orifice 45 (see FIG. 6) causing the pressurized liquid cream to escape along the path indicated by the arrow in FIG. 5. Since the land surrounding the opening 23 is preferably dished, as previously mentioned, headroom is provided in the hub for fluid flow. After the cream escapes through the orifice and past the plunger, it moves through the passages 54 and into the expansion chamber 53 of the nozzle where the cream expands into whipped form for discharge from the nozzle tip 55. As the discharge progresses from the point where the valve surfaces are barely cracked open to the condition of maximum discharge illustrated in FIG. 6, the effect is to progressively increase both the width and the total length of the crescent-shaped opening 45. It is found that this arrangement provides a fine degree of control not achieved by conventional valves which tend to be more sudden or explosive in their action. Maximum discharge is obtained when the nozzle bottoms on the end of the hub. Since it is sufficient for the nozzle to move such a short distance between zero and full discharge, on the order of $\frac{1}{32}$ inch, the discharge is primarily controlled by pressure or "feel" against the restoring effect of the resilient skirt 56, and there is no necessity, therefore, for the user to judge the amount of nozzle displacement. Thus the present valve will be found to provide a serving of whipped cream easily and without any particular care or attention, and the valve may be operated by small children without difficulty.

It will be apparent to one skilled in the art that all the valving functions are performed by addition of but a single insert of molded rubber to the central boss or hub provided in the cap of a container of the aerosol type. Such insert may be manufactured at negligible cost by a molding operation and may be installed simply by pressing into seated position. For use with a dip tube, as indicated at 95 in FIG. 8, the collar portion of the valve may simply be extended downwardly below the level of the hub to provide a surface for dip tube attachment, corresponding parts being identified with corresponding reference numerals with addition of subscript a.

While the term "rubber" has been used for convenience, it will be understood that this term is used simply to denote the desired resilient qualities of the insert and the term includes, within its scope, synthetic rubber and the various rubber substitutes which are commonly available. While the term "spoke" has been used to describe the resilient connection between the portions 31, 32 of the insert, it will be understood that this term refers generally to means for bridging the annular space 33. Moreover, while the term "relatively sharp" has been used to describe the nature of the tip 41 of the plunger 40, it will be understood that the sharpness refers to a tip which is sufficiently concentrated to apply a pressure which is localized along one side of the discharge opening.

Also while the invention has been described in connection with a dispenser for whipped cream, it will be understood that the valve and nozzle construction are not limited to this usage and may be employed in the dispensing of shaving soap or other materials which are intentionally foamed at the point of discharge. Finally, while the valve insert is particularly well suited for use with the foaming nozzle shown, it will be apparent to one skilled in the art that it may, if desired, be used with other specific shapes of nozzles, for example, spray nozzles, having a plunger or projection capable of extending through the discharge opening for unseating of the valve member.

In order to further simplify the construction while achieving the benefits provided by the inwardly extending, tapered flange 90, the flange, instead of being molded in the insert, may be formed in situ by deformation of the inner end of the resilient collar as it is forced into its seated position. Thus the inner end of the collar 32, instead of being flat, may be formed in a frusto-conical locus as indicated at 90a in FIG. 5. Thus when the collar is forcibly seated the tapering end of the collar is compressed and tends to crowd inwardly to form a flange which is similar, in cross-section, to that which is illustrated at 90. This has the additional benefit of concentrating the sealing force along the inner periphery of the flange to further improve the seal against the end wall of the hub.

We claim as our invention:

1. In a valve construction for an aerosol whipped cream dispenser, the combination comprising a cap having a hollow cylindrical hub at its center including an end wall and a side wall, said end wall having a central opening defining an internal land, a cylindrical valve member of resilient material having a collar encircling the same to define an annular interspace, said valve member and collar being formed integrally of resilient material and interconnected by radial spokes for limited axial movement with respect to one another, said collar being dimensioned to fit snugly into the hub with the collar in engagement with the side wall of the hub, said valve member and collar having a relative axial dimension such that when the collar is fully seated in the hub the valve member is in seated engagement with the land for sealing the dispenser, and a hollow nozzle having a plunger presenting a relatively sharp tip projecting through the central opening adjacent one side thereof for pressing upon the end of the valve member so that the valve member is progressively unseated from the land starting at the region adjacent the sharp tip for controlled discharge of the contents of the dispenser.

2. In a valve construction, for an aerosol whipped cream dispenser, the combination comprising, a cap having a hollow cylindrical hub at its center including an end wall and a side wall, said end wall having a central opening defining an internal land, a cylindrical valve member of resilient material having a collar surrounding the same, the collar being seated in the hub, the valve member and collar being integrally formed of a single piece of rubber and having a resilient connection therebetween so that the valve member is seated against the land and which permits both bodily inward movement and cocking movement of the valve member in response to applied force, and a nozzle including a plunger having a relatively sharp tip extending through the opening along one side thereof for pressing against the valve member for unseating thereof upon application of finger tip pressure to the nozzle to define an escape orifice of crescent configuration and variable length for controlled release of the contents of the dispenser.

3. In a valve construction for an aerosol whipped cream dispenser the combination comprising a cap having a hollow cylindrical hub at its center including an end wall and a side wall, said end wall having a central opening defining an internal land, a valve member inside of said hub alined with the opening and having a resilient surface for seating on said land, a collar snugly telescoped into the hub and having a symmetrical resilient connection with the valve member for permitting cocking movement of the valve member in any direction away from said land, a nozzle including a valve plunger extending through said opening into engagement with the valve member, said valve plunger having a relatively sharp tip arranged to engage the valve member adjacent one side of the opening, said nozzle having a limit stop for bottoming with respect to the cap as the valve member is progressively cracked open at one side for controlled discharge of the contents of the dispenser.

4. In a valve construction for an aerosol whipped cream dispenser the combination comprising a cap having a curled periphery and a hollow cylindrical hub at its center including an end wall and a side wall, said end wall having a central opening defining an internal land, a valve insert of cylindrical shape snugly fitted in the hub and occupying substantially all of the space therein, said valve insert being formed of a central valve member and a collar surrounding the same interconnected at their lower ends by spokes of limited cross-section and integrally formed of a single molded piece of rubber so that the central valve member is floatingly biased against the land, a nozzle mounted for endwise telescoping movement with respect to the hub and having a finger hold for applying endwise pressure, said nozzle being of hollow construction including a plunger having a relatively sharp tip of spade shape which extends through said opening adjacent one side thereof to apply cocking force to the valve member thereby to open a crack of crescent configuration for escape of the pressurized cream into the nozzle when pressure is applied to the finger hold.

5. In a valve construction for an aerosol whipped cream dispenser the combination comprising a cap having a hollow cylindrical hub at its center including an end wall and a side wall, said end wall having a central opening defining an internal land, a valve insert of cylindrical shape snugly fitted in the hub and substantially filling the same, said valve insert being formed of a central valve member and a surrounding collar interconnected by spokes of limited cross-section and integrally formed of a single molded piece of rubber so that the central valve member is floatingly seated against the land, a nozzle of relatively rigid material mounted for endwise telescoping movement with respect to the hub and having a finger hold for applying endwise pressure, said nozzle being of hollow construction including a plunger having a relatively sharp tip which extends through said opening adjacent one side thereof thereby to apply cocking force to the valve member to open a crack of crescent shape for escape of the pressurized cream into the nozzle when pressure is applied to the finger hold, and means limiting the lateral movement of the valve member in response to the cocking force so that the valve member is maintained at all times in a position to reseal against said land when pressure on the nozzle is released.

6. In a valve construction for an aerosol whipped cream dispenser the combination comprising a cap having a hollow cylindrical hub at its center including an end wall and a side wall, said end wall having a central opening defining an internal lad, a valve insert of cylindrical shape snugly fitted in the hub, said valve insert being formed of a central valve member and a collar surrounding the same interconnected by spokes of limited cross-section and integrally formed of a single molded piece of rubber so that the central valve member is floatingly seated against the land, a nozzle mounted for endwise telescoping movement with respect to the hub and having a finger hold for applying endwise pressure, said nozzle being of hollow construction including a plunger which extends through said opening adjacent one side thereof for moving the valve member inwardly thereby to open a crack of crescent shape for escape of the pressurized cream into the nozzle when pressure is applied to the finger hold, means including a stop surface on the nozzle for bottoming with respect to the cap and for severely limiting the inward movement of the plunger, and means including a stop surface interposed between the valve member and the collar for limiting the lateral movement of the valve member so that the valve member is maintained at all times in a position to reseal against said land when pressure on the nozzle is released.

7. In a valve construction for an aerosol whipped cream dispenser, the combination comprising a cap having a hollow cylindrical hub at its center including an end wall and a side wall, said end wall having a central opening defining an internal land, a valve insert of cylindrical shape snugly fitted in the hub, said valve insert being formed of a central valve member and a collar surrounding the same interconnected by spokes of limited cross-section and integrally formed of a single molded piece of rubber so that the central valve member is floatingly seated against the land, a nozzle mounted for endwise telescoping movement with respect to the hub and having a cylindrical recess for telescoping of the nozzle over the hub, said nozzle having a valve unseating member in the form of a relatively sharp tip generally centered in said recess and extending through said opening adjacent one side thereof for application of unseating force concentrated at one side of the valve member thereby to open a crack of crescent shape for escape of the pressurized cream into the nozzle when finger force is applied axially thereto, and means including a stop surface on the nozzle for limiting the inward movement of the nozzle with respect to the hub and hence the degree of unseating of the valve member.

8. In a valve construction for an aerosol whipped cream dispenser, the combination comprising a cap having a peripheral curl and having a hollow cylindrical hub at its center including an end wall and a side wall, said end wall having a central opening defining an internal land, a valve insert snugly fitted in the hub, said valve insert being formed of a central valve member and a collar surrounding the same interconnected by radially extending spokes of limited cross-section and integrally formed of a single molded piece of rubber so that the central valve member is floatingly biased against the land, said collar having an axially extensive cylindrical outer surface providing resilient frictional engagement with the side wall of the hub, a nozzle mounted for endwise telescoping movement with respect to the hub and having a radial skirt telescoping over the curl as well as a cylindrical recess for telescoping over the hub, said nozzle having a fingerhold surface above the skirt, said nozzle having a valve unseating member in the form of a relatively sharp tip generally centered in said recess and extending through said opening for application of unseating force to open a crack for escape of the pressurized cream into the nozzle when force is applied axially to the fingerhold, and means including a stop surface on the nozzle for limiting the inward movement of the nozzle with respect to the hub and hence the degree of unseating of the valve member.

9. In a valve construction for an aerosol whipped cream dispenser the combination comprising a cap having a hollow cylindrical hub at its center including an end wall and a side wall, said end wall having a central opening defining an internal land, a valve member of resilient material having a collar radially spaced therefrom, the valve member being of cylindrical shape and the collar member being cylindrical and substantially coextensive in the axial direction with the valve member to define an axially extending annular space between them, spokes integrally formed with the valve member and collar member extending through the annular space to interconnect the lower portions of the collar member and valve member, said collar being dimensioned to fit snugly into the hub with the collar in extensive frictional engagement with the side wall of the hub, the axial length of the valve member and collar being so related that when the collar is bottomed in the hub said spokes and valve member are stressed so that the presented end of the valve member is seated on the land even in the absence of internal pressure, said spokes being at a sufficiently low level and sufficiently resilient as to permit bodily cocking the valve member by application of force to one side thereof for dispensing of the contents of the dispenser.

10. In a valve member for an aerosol whipped cream dispenser, the combination comprising a cap having a hollow cylindrical hub at its center including an end wall and a side wall, said end wall having a central opening defining an internal land, a cylindrical valve member alined with the opening and seated on the land, a retaining collar of resilient material telescoped into the hub and in frictional engagement with the wall thereof to define an annular space with respect to the valve member, a resilient connection between the valve member and collar having apertures for communicating with the dispenser, said collar having an integral inwardly directed and tapering flange for seating against the end wall of the hub and surrounding the opening so that when the valve is unseated and pressure is applied in said annular space for pressurizing the dispenser such pressure will apply an endwise component of force to the flange for retaining the collar in seated position thereby to avoid dislodgement of the collar and valve member incident to the pressurizing operation.

11. In a valve construction for an aerosol whipped cream dispenser, the combination comprising a cap having a hollow cylindrical hub at its center including an end wall and a side wall, said end wall having a central opening defining an internal land, an integral valve insert formed of a molded piece of rubber dimensioned for snug insertion into the hub and substantially filling the same, said insert being formed of a central cylindrical portion and an outer collar portion having an annular space between them and interconnected by radial spokes of reduced cross-section so that the central portion is resiliently urged against the land yet subject to endwise and cocking movement away from the land in response to an unseating force, a nozzle including a valve plunger extending axially into the opening and mounted for limited endwise movement to apply said unseating force, the tip of said valve plunger being faced at an angle so that the unseating force is applied to the cylindrical portion in an off center position thereby to crack said valve open along one side thereof for controlled escape of the contents, said collar portion having an integral, inwardly extending flange at the end thereof seating against the end wall of the hub and overlying said annular space so that when pressure exists in said annular space there is a component force in the axial direction tending to cause said insert to remain in the hub.

12. In a valve construction for an aerosol whipped cream dispenser the combination comprising a cap having a hollow cylindrical hub at its center including an end wall and a side wall, said end wall having a central opening defining an internal land, a valve member of resilient material having a collar radially spaced therefrom to provide an annular flow passage, the valve member and the collar being joined by an axially thin radial connection and providing communication with said passage, said collar having an axially extensive cylindrical outer surface providing resilient frictional engagement with the side wall of the hub, the collar having a presented end which lies in a frusto-conical locus to define a relatively sharp edge which is deformed inwardly when the collar is forcibly bottom in the hub, said radial connection and valve member together being sufficiently resilient as to permit localized unseating of the valve member along one side thereof by application of an inward force localized along the edge of the hub opening.

References Cited
UNITED STATES PATENTS

| | | | |
|---|---|---|---|
| 2,805,003 | 9/1957 | Ayres | 222—394 |
| 2,861,723 | 11/1958 | Cooksley | 222—394 |
| 2,862,648 | 12/1958 | Cooksley et al. | 251—353 X |
| 2,963,265 | 12/1960 | Goodspeed | 222—394 X |

RAPHAEL M. LUPO, *Primary Examiner.*